United States Patent [19]
Titterington et al.

[11] Patent Number: 5,919,839
[45] Date of Patent: Jul. 6, 1999

[54] PHASE CHANGE INK FORMULATION USING AN ISOCYANATE-DERIVED WAX AND A CLEAR INK CARRIER BASE

[75] Inventors: Donald R. Titterington, Tualatin; Jeffery H. Banning, Hillsboro; Clifford R. King, Salem, all of Oreg.

[73] Assignee: Tektronix, Inc., Wilsonville, Oreg.

[21] Appl. No.: 08/907,805

[22] Filed: Aug. 8, 1997

Related U.S. Application Data

[63] Continuation-in-part of application No. 08/672,609, Jun. 28, 1996, Pat. No. 5,750,604.

[51] Int. Cl.$^6$ ............................. C08J 3/00; C08K 3/20; C08L 75/00; C09D 5/00
[52] U.S. Cl. .................... 523/161; 101/491; 106/31.13; 106/31.27; 106/31.29; 106/31.43; 106/31.57; 106/31.61; 523/160; 524/187; 524/589; 524/590; 524/210; 524/230
[58] Field of Search ................ 106/19 R, 20 R, 106/22 R, 23 R, 23 A, 23 H, 22 A, 22 H, 20 D, 19 F, 31.13, 31.27, 31.29, 31.43, 31.57, 31.61; 101/491; 524/187, 589, 590, 210, 230; 523/160, 161

[56] References Cited

U.S. PATENT DOCUMENTS

| | | | |
|---|---|---|---|
| 2,409,712 | 10/1946 | Schweitzer | 260/453 |
| 3,012,991 | 12/1961 | Schultheis et al. | 260/75 |
| 3,653,932 | 4/1972 | Berry et al. | 106/22 |
| 3,963,710 | 6/1976 | Aufdermarsh, Jr. | 260/247.2 |
| 4,011,311 | 3/1977 | Noomen et al. | 424/65 |
| 4,293,470 | 10/1981 | Cuscurida | 260/45.9 |
| 4,297,501 | 10/1981 | Becker et al. | 560/24 |
| 4,334,032 | 6/1982 | Patton, Jr. et al. | 521/115 |
| 4,381,403 | 4/1983 | Falcone et al. | 560/24 |
| 4,390,369 | 6/1983 | Merritt et al. | 106/31 |
| 4,484,948 | 11/1984 | Merritt et al. | 106/31 |
| 4,501,915 | 2/1985 | McCoy | 560/157 |
| 4,537,960 | 8/1985 | Merger et al. | 544/86 |
| 4,665,146 | 5/1987 | Tortorello et al. | 526/304 |
| 4,684,956 | 8/1987 | Ball | 346/1.1 |
| 4,810,820 | 3/1989 | Slack et al. | 560/27 |
| 4,851,045 | 7/1989 | Taniguchi | 106/31 |
| 4,889,506 | 12/1989 | Connolly et al. | 439/874 |
| 4,889,560 | 12/1989 | Jaeger et al. | 106/27 |
| 4,889,761 | 12/1989 | Titterington et al. | 428/195 |
| 5,006,170 | 4/1991 | Schwarz et al. | 106/20 |
| 5,151,120 | 9/1992 | You et al. | 106/27 |
| 5,195,430 | 3/1993 | Rise | 100/168 |
| 5,221,335 | 6/1993 | Williams et al. | 106/23 |
| 5,231,135 | 7/1993 | Machell et al. | 525/123 |
| 5,372,852 | 12/1994 | Titterington et al. | 427/288 |
| 5,389,720 | 2/1995 | Markusch et al. | 524/839 |
| 5,389,958 | 2/1995 | Bui et al. | 347/103 |
| 5,496,879 | 3/1996 | Griebel et al. | 524/320 |
| 5,621,022 | 4/1997 | Jaeger et al. | 523/161 |

FOREIGN PATENT DOCUMENTS

| | | |
|---|---|---|
| 0187352 | 7/1986 | European Pat. Off. . |
| 0206286 | 12/1986 | European Pat. Off. . |
| 4205636 | 8/1993 | Germany . |
| 4205713 | 8/1993 | Germany . |
| 9404619 | 3/1994 | WIPO . |
| 9414902 | 7/1994 | WIPO . |
| 9602399 | 9/1996 | WIPO . |
| 9602446 | 10/1996 | WIPO . |

OTHER PUBLICATIONS

"Polymer Chemistry—The Basic Concepts" by Paul C. Hiemenz, California State Polytechnic University, Pomona, California, p. 7.

"Technical Product Information" Luxate® Isophorone Diisocyanate, by Olin Chemicals, Olin Corporation, 2 pgs.

"Advanced Organic Chemistry" Reactions, Mechanisms, and Structure, Third Edition, by Jerry March, Professor of Chemistry, Adelphi University, 6 pgs.

*Primary Examiner*—Patrick D. Niland
*Attorney, Agent, or Firm*—Ralph D'Alessandro

[57] ABSTRACT

Colored waxes are made by reacting selected nucleophiles, including alcohol containing colorants with an isocyanate are disclosed. A phase change ink is made by blending the colored wax with a clear ink carrier composition. The clear ink carrier composition can be a fatty amide-based material and/or a combination of isocyanate-derived resins in which the order of addition of the isocyanate and the different nucleophiles can tailor the distribution of di-urethane, mixed urethane/urea, and/or di-urea molecules in the final resin product. The colored wax materials are useful as ingredients with phase change ink carrier compositions to make phase change ink jet inks.

44 Claims, No Drawings

PHASE CHANGE INK FORMULATION USING AN ISOCYANATE-DERIVED WAX AND A CLEAR INK CARRIER BASE

BACKGROUND OF THE INVENTION

This patent application is a continuation-in-part of U.S. Pat. No. 08/672,609, Jun. 28, 1996 now U.S. Pat. No. 5,750,604 issued May 12, 1998 entitled "Phase Change Ink Formulation Using A Urethane Isocyanate Derived Resin", filed Jun. 28, 1996 and assigned to the assignee of the present invention.

FIELD OF THE INVENTION

The present invention relates to phase change inks made from colored waxes blended with ink carrier compositions. The colored waxes are made by reacting isocyanates with selected colorants containing a nucleophilic functional group, such as alcohols and/or amines. The phase change ink compositions, both generally and in specific compositions, can contain resins in combination with the colored waxes. More particularly, the present invention employs the use of a colored urethane isocyanate-derived wax and a clear ink carrier composition. The clear ink carrier composition can be a fatty amide-based material and/or a urethane resin and/or a mixed urethane/urea resin and an uncolored urethane wax. Still further, the present invention relates to the process of using such phase change ink compositions containing such waxes in a printing device.

DESCRIPTION OF THE RELEVANT ART

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwerk Farbenfabrik Keller, Dr. Rung and Co.

Phase change inks for color printing generally comprise a phase change ink carrier composition which is combined with a phase change ink compatible colorant. Preferably, a colored phase change ink will be formed by combining the above-described ink carrier composition with compatible subtractive primary colorants. The subtractive primary colored phase change inks of this invention can comprise four component dyes, namely, cyan, magenta, yellow and black. U.S. Pat. Nos. 4,889,560; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. Pat. No. 5,621,022 issued Apr. 15, 1997, and assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

In addition to the above-referenced U.S. patents, many other patents describe materials for use in phase change ink jet inks. Some representative examples include U.S. Pat. Nos. 3,653,932; 4,390,369; 4,484,948; 4,684,956; 4,851,045; 4,889,560, 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT Patent Application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65° C. and obtained by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (TPGBE) and propylene glycol phenyl ether (PPL)); esterified dihydric aliphatic alcohol (e.g. the esterifyng acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot melt printing), or dihydric polyalkylene glycol. This PCT Application further defined the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol).

PCT Patent Application WO 97/12003 which was published on Apr. 3, 1997 and is assigned to Coates Brothers PLC, discloses a hot melt ink carrier material and an ink formed from the reaction of a mono- or diisocyanate with one or more functional amide materials that are the reaction products of hydroxy functional primary or secondary amines or diprimary diamines or a mixture thereof and a monofunctional carboxylic acid, a difunctional carboxylic acid, or a hydroxy carboxylic acid or mixtures of any two thereof.

PCT Patent Application WO 97/13816 which was published on Apr. 17, 1997 and is assigned to Coates Brothers PLC, discloses an oligomeric hot melt ink carrier material for use in a hot melt ink formed of molecules having a backbone and at least one pendant side-chain and a dyestuff reacted into the backbone. The oligomeric material is a reaction product obtained from the reaction of an aliphatic or aromatic mono- or diisocyanate with a dyestuff which is a hydroxyl group functional dye component diluted with a non-volatile reactive diluent and one or more other fully saturated materials selected from mono- and dihydric alcohols, primary and secondary monoamines, diprimary amines, functional amides and hydroxyfunctional amines.

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

There is still a need for new materials for novel and different applications of phase change inks. There is also a need for colorants specifically designed to be compatible with phase change ink systems and colorants of high purity. These needs are solved by the present invention by providing a means to tailor the properties of isocyanate-derived colored waxes for specific applications and use in phase change inks.

BRIEF SUMMARY OF THE INVENTION

It is an aspect of the present invention that colored phase change inks utilizing the reaction product of an isocyanate and at least one hydroxyl-containing colorant to form a colored urethane wax are created when the colored urethane wax is mixed with a clear ink carrier composition.

It is another aspect of the present invention that the clear ink carrier composition can be a fatty amide-based material and/or a urethane resin and/or a mixed urethane/urea resin.

It is yet another aspect of the present invention that a method for producing a layer of a phase change colored ink on the surface of a substrate by either direct or indirect printing is obtained wherein the phase change ink composition in the solid phase comprises an admixture of (a) a colored urethane wax and (b) a clear phase change ink carrier composition.

It is a feature of the present invention that the colored urethane isocyanate-derived wax when used with a clear ink carrier composition that can be a fatty amide-based material and/or a urethane resin and/or a mixed urethane urea resin obviates the need for the use of separate colorants in an ink formulation because the resulting ink possesses sufficient spectral strength.

It is an advantage of the present invention that the urethane isocyanate-derived colored waxes can be design engineered to obtain desired properties for specific printing platforms and architectures.

It is another advantage of the present invention that the urethane isocyanate-derived colored waxes are very pure, being free of salts and other insoluble contaminants.

It is still another advantage of the present invention that the urethane isocyanate-derived colored wax can be used in combination with other phase change ink carrier materials to obtain ink compositions that possess excellent spectral strengths.

It is yet another advantage of the present invention that the isocyanate-derived colored waxes are substantially transparent.

These and other aspects, features and advantages are obtained by the use of colored urethane isocyanate-derived waxes that are the reaction products of selected isocyanates with selected hydroxyl-containing colorants that are suitable for use with clear ink carrier compositions in phase change inks that may be employed in direct or indirect printing applications.

DESCRIPTION OF THE PREFERRED EMBODIMENTS

The term "nucleophile" in the present specification and claims is used as defined on page 179 of "Advanced Organic Chemistry", 3rd Edition by Jerry March, ©1985 by John Wiley and Sons, to describe a reagent that brings an electron pair to a reaction to form a new bond. The preferred nucleophiles of this invention are alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, ©, 1984 by Marcel Dekker, Inc., to describe a term coined to designate molecules for which n (representing the number of repeating monomer units) is less than 10.

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The term "isocyanate-derived wax" as used in the present specification and claims is defined as any crystalline or semicrystalline waxy material derived from the reaction of a fatty isocyanate with a suitable nucleophile, or the reaction of a fatty nucleophile with a suitable isocyanate, or the reaction of a fatty nucleophile with a fatty isocyanate.

The term "urethane isocyanate-derived resin" as used in the present specification and claims is defined as any resin that is a urethane that is the product of the reaction of an isocyanate and an alcohol.

The term "urea isocyanate-derived resin" as used in the present specification and claims is defined as any resin that is a urea that is the product of the reaction of an isocyanate and an amine.

The term "urethane/urea isocyanate-derived resin" as used in the present specification and claims is defined as any resin that is a mixed urethane/urea that is the product of the reaction of an isocyanate, an alcohol and an amine.

Any suitable reaction conditions for making urethane or urea compounds by condensing alcohols and/or amines with isocyanates may be employed in the practice of the present invention. Preferably, the reaction is carried out at elevated temperatures (e.g. about 60° C. to about 160° C.) in the presence of a urethane reaction catalyst such as dibutyltindilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reactants, the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diisocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI. See J. H. Saunders and K. C. Frisch's "Polyurethanes Part I, Chemistry" published by Interscience of New York, New York in 1962 and Olin Chemicals' Luxate® IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The clear isocyanate-derived resins from reactions used to provide the clear ink carrier composition for the colored waxes are generally transparent solids having melting points in the range of about 20° C. to about 150° C., viscosities in the range of about 10 cPs to about 5000 cPs at 150° C. and $T_g$'s of about −30° C. to about 100° C. The uncolored isocyanate-derived waxes from these reactions are generally opaque waxy solids having sharp melting points from about 50° C. to about 130° C., and viscosities of about I cPs to about 25 cPs at 140° C. The isocyanate-derived resins and waxes providing the clear ink carrier compositions display properties such that the higher the $T_g$ or the melting point, the higher is the viscosity. While the structural activity relationships are not fully understood, it is known that the $T_g$ of the isocyanate-derived resins is controlled by the proper choice of the mixture of nucleophiles in the reaction as illustrated in Table 3 of co-pending U.S. Pat. No. 5,750,604 issued May 12, 1998 and assigned to the assignee of the present invention. Varying one or more of the readily available commodity chemicals used as chemical precursors will permit custom-tailoring of the properties of the isocyanate-derived resin and wax materials.

The preferred chromogen-containing nucleophilic molecules useful in this invention include dyes such as those disclosed in U.S. Pat. Nos. 3,994,835 and 4,132,840, assigned to Bayer, and U.S. Pat. Nos. 4,284,729; 4,507,407; 4,751,254; 4,846,846; 4,912,203; 5,270,363 and 5,290,921, assigned to Milliken Research Corporation. Also suitable may be any Color Index (C.I.) Solvent Dyes, Disperse Dyes, modified Acid and Direct Dyes, Basic Dyes, Sulphur Dyes or Vat Dyes that contain an alcohol, amine, or other nucleophilic functional group that is capable of reacting with an isocyanate. The more preferred chromogen-containing nucleophilic molecules contain at least one alcohol functional group. Most preferably this alcohol functional group is the terminal functional group to a polyoxyalkylene chain such as a polyethylene oxide, polypropylene oxide, or a polyethylene/polypropylene oxide polymeric chain.

The following materials may be employed to provide the clear ink carrier compositions that may be used with the colored urethane isocyanate-derived waxes of the present invention to obtain colored phase change ink compositions of high spectral strength.

Preferred alcohols to react with difunctional and higher isocyanates to make the uncolored isocyanate-derived waxes and resins employed in this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N, N-di methyl-N-ethanol amine, stearamide-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred amines to react with difunctional and higher isocyanates to make the uncolored isocyanate-derived waxes and resins employed in this invention include any monofunctional amine, with the exception of tertiary amines void of other nucleophilic functional groups (e.g., triethylamine). For instance, the monoamine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-,t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, di methyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-di methyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex.; 3,3'-diamino-N-methyl-dipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the uncolored isocyanate-derived waxes and resins employed in this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-)propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexy-1 -propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-di methyl-N-ethanol amine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N, N',N'-tetrakis(2-hydroxypropyl)ethylenediamine, and the like. The preferred alcohol is octadecanol.

Preferred amines to react with monofunctional isocyanates to make the uncolored isocyanate-derived waxes and resins employed in this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, di methyl amine, diethyl amine, di(n-, and iso-) propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)octadecyl amine, di(n-, iso-, t-, and the like)dodecyl amine, cyclohexyl amine, 2,3-di methyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1, 12-dodecanediamine; 3-dimethylaminopropylamine; 4,7,10-trioxa- 1,13-tridecanediamine; diethylene triamine; 3,3-diamino-N-methyldipropylamine; tris(2-aminoethyl)amine, and the like. The preferred amine is octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanol amine, diethanolamine, and the like.

Additionally amides or other nucleophile containing compounds can be reacted with the isocyanates (mono, di, and the like). Some examples include: urea, oleamide, stearamide, or the like.

Preferred precursors to the uncolored isocyanate-derived resins and waxes employed with the colored waxes of the present invention include mono-, di- and other polyisocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_{12}MDI$); tetra-methyl xylene diisocyanate (TMXDI); hexamethylene-1,6-diisocyanate (HDI); hexamethylene- 1,6-diisocyanate; napthylene- 1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Phase change inks of this invention can contain a clear phase change carrier system or composition made from the afore described compounds and reactions. The phase change carrier composition when combined with the colored urethane isocyanate-derived waxes of the present invention is generally designed for use in either a direct printing mode or use in an indirect or offset printing transfer system. In the direct printing mode, the phase change carrier composition and colored wax ink blend is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change inks of the current invention can incorporate uncolored isocyanate-derived waxes and isocyanate-derived resins as all or as part of the carrier composition and can be a supplemental ingredient or supplemental ingredients to the existing commercial phase change carrier composition. The isocyanate-derived materials of the current invention are tailored to have the desirable properties mentioned above when used in the carrier composition of the inks of the present invention by varying one or more of the readily available commodity chemical precursors.

The phase change inks of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. Pat. No. 5,621,022 issued Apr. 15, 1997 and/or pigments. They may also be used in combination with the isocyanate-derived colored resins of co-pending U.S. Pat. No. 5,780,528 issued Jul. 14, 1998 and assigned to the assignee of the present invention, to produce a phase change ink.

Prior art phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. A preferred mono-amide is stearyl stearamide. A preferred tackifier resin is a glycerol ester of hydrogenated abietic (rosin) acid and a preferred antioxidant is that provided by Uniroyal Chemical Company under the tradename Naugard 524. The isocyanate-derived resins and/or isocyanate-derived waxes employed in the present invention can replace one or more of the ingredients in the above phase change ink carrier composition or the inks of the present invention can have all of the above ingredients replaced by the uncolored isocyanate-derived resins and/or waxes blended with the colored isocyanate-derived colored waxes of the present invention. The advantages of inks formulated with colored isocyanate-derived waxes of the present invention over the prior art phase change inks are:

(1) The colored isocyanate-derived waxes of this invention are very pure, being free of salts and other insoluble contaminants. This makes the inks made from these materials easy to filter and provides for high reliability in ink jet printing devices. This is a major advantage.

(2) The colored isocyanate-derived waxes of this invention are specifically tailored to give certain physical properties that optimize the performance of the inks of this invention in ink jet printing devices and on the output substrate. These desirable ink properties include melting point, viscosity, transparency and the dynamic mechanical properties referenced in the aforementioned U.S. Pat. No. 5,389,958.

(3) The colored isocyanate-derived waxes of this invention can be used in certain combinations with other phase change ink carrier materials to give ink compositions that display an improved yield stress versus temperature curve over prior art ink compositions, as well as having excellent spectral strengths. This enables ink droplets to be spread and fused at elevated temperatures during the fusing and transfer steps in an indirect printing process, but at a lower pressure than was possible with prior art inks.

The hydroxy functional colorants utilized in the present invention are of particularly high purity, preferably as high as about 98% pure. Other colorants, such as those that are utilized in the aforementioned PCT Patent Application WO 97/13186, are diluted with a polyester polyol or are reduced with a volatile or non-volatile organic solvent or other diluents. Waxes produced from using such diluted colorants will contain an undesired non-colored urethane which will also contain multiple ester linkages. The high purity hydroxy functional colorants used to make the colored urethane waxes employed in the present invention possess no dispersants, no fillers, no extenders, no diluents, no reactive diluents, no chain extenders, no solvents or volatile organics, no uncolored salts, no leveling agents, no materials which impart "hand" to textiles, no sequestering agents, no chelating agents, no wetting agents, no stabilizing agents such as anti-oxidants, thermal agents or light stabilizing agents.

Many other patents describe other materials for use in phase change ink jet inks. Some representative examples include U.S. Pat. Nos. 3,653,932; 4,390,369; 4,484,948; 4,684,956; 4,851,045; 5,006,170; 5,151,120; EP Application Nos. 0187352 and 0206286; and PCT Patent Application WO 94/04619. These other materials can include paraffins, microcrystalline waxes, polyethylene waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the colored isocyanate-derived waxes of this invention could be used in inks made from many different combinations of these materials.

The aforementioned U.S. Pat. No. 5,496,879 and German patent publications DE 4205636AL and DE 4205713AL, assigned to Siegwerk Farbenfabrik Keller, Dr. Rung and Co., describe materials used for phase change or hot melt gravure printing. It will be obvious to those skilled in the art that the colored isocyanate-derived waxes of this current invention would be compatible with those materials and could also be used in that application or other similar printing methods that employ hot melt ink technology.

It also will be obvious to those skilled in the art that other ink colors besides the subtractive primary colors are desirable for applications, such as postal marking or industrial marking and labeling using phase change printing, and that this invention is applicable to these needs. Infrared (IR) or ultraviolet (UV) absorbing dyes can also be incorporated into the inks of this invention for use in applications such as "invisible" coding or marking of products.

The inks of the present invention can be equally well employed in apparatus for direct or indirect (offset) printing applications. When employed in direct printing applications a suitable method of printing or producing a layer of a phase change colored ink directly on the surface of a substrate can comprise:

(1) forming a phase change ink composition in the solid phase, comprising an admixture of (a) a clear phase change carrier composition and (b) a colored urethane wax material, the colored urethane wax material being the reaction product of an isocyanate and a hydroxyl-containing colorant;

(2) transferring the solid phase, phase change colored ink composition to a phase change ink application means or print head, (3) raising the operating temperature of the application means or print head to a level whereby a liquid phase, phase change colored ink composition is formed;

(4) providing a substrate in proximity to the application means;

(5) applying a predetermined pattern of the liquid phase, phase change colored ink composition to at least one surface of the substrate; and (6) lowering the temperature of the applied ink composition to form a solid phase, phase change ink pattern on the substrate.

An appropriate direct printing process is described in greater detail in U.S. Pat. No. 5,195,430.

When employed in indirect or offset printing applications a suitable method of printing or producing a layer of a phase change colored ink indirectly on the surface of a substrate by transferring from an intermediate transfer surface can comprise:

(1) forming a phase change ink composition in the solid phase, comprising an admixture of (a) a clear phase change carrier composition and (b) a colored urethane wax material, the colored urethane wax material being the reaction product of an isocyanate and a hydroxyl-containing colorant.

(2) transferring the solid phase, phase change colored ink composition to a phase change ink application means or a print head;

(3) raising the operating temperature of the application means or print head to a level whereby a liquid phase, phase change colored ink composition is formed;

(4) providing an intermediate transfer surface in proximity to the application means;

(5) applying a predetermined pattern of the liquid phase, phase change colored ink composition to the intermediate transfer surface;

(6) lowering the temperature of the applied ink composition to form a solid phase, phase change ink pattern on the intermediate transfer surface at a second, intermediate temperature;

(7) transferring said phase change ink composition from the intermediate transfer surface to a final substrate; and (8) fixing the phase change ink composition to the substrate to form a printed substrate, the phase change ink composition having (a) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (b) a ductility on the substrate after fixing.

An appropriate offset or indirect printing process is described in greater detail in U.S. Pat. No. 5,389,958.

The present invention is further described in detail by means of the following Examples and Comparisons. All parts and percentages are by weight and all temperatures are degrees Celsius unless explicitly stated otherwise. It is to be noted that while the following examples may recite only one colorant, it is to be understood that each individual example is only illustrative and any of the primary colorants (cyan, yellow, magenta and black) or any blend thereof used in subtractive color printing could be employed in each instance, or other non-process shade colorants for use in other than substractive color printing applications could be employed.

EXAMPLE 1

The Reaction Product of Octadecyl Isocyanate and Yellow Reactive Colorant

About 119.4 grams (0.417 equiv.) of octadecyl isocyanate[1] and about 300.0 grams (0.430 equiv.) of a yellow hydroxyl-containing colorant corresponding to Colorant A from Table I of U.S. Pat. No. 5,231,135 was added to a 1000 ml three-neck resin kettle equipped with a Trubore stirrer, an $N_2$ atmospheric inlet, and thermocouple-temperature controller. The mixture was agitated for several minutes and about 0.5 grams of dibutyltindilaurate catalyst[2] was added and the reaction mixture heated to about 135° C. with stirring under an $N_2$ atmosphere. After 4.0 hours at 135° C. an FT-IR spectrum of the product was obtained to insure all isocyanate functionality was consumed. The absence (disappearance) of a peak at about 2275 $cm^{-1}$ (NCO) and the appearance (or increase in magnitude) of peaks at about 1740–1680 $cm^{-1}$ and about 1540–1530 $cm^{-1}$ corresponding to urethane frequencies was used to confirm this. The final colored urethane wax product was then poured into aluminum molds and allowed to cool and harden. This final product was a soft yellow wax at room temperature characterized by the following physical properties: viscosity of about 20.6 cPs as measured by a Ferranti-Shirley cone-plate viscometer at about 140° C., and melting point of 13.7° C. as measured by Differential Scanning Calorimetry using a DuPont 2100 calorimeter. The spectral strength of the wax was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the wax was measured as about 23037 milliliters×Absorbance Units per gram at the lambda max of about 424 nm.

[1]Mondur O—Octadecyl Isocyanate available from Bayer Corp. of Pittsburg, Pa.
[2]Dibutyltindilaurate available from Aldrich Chemicals of Milwaukee, Wis.

EXAMPLE 2

The Reaction Product of Octadecyl Isocyanate and Orange Reactive Colorant

About 259.6 grams (0.910 equiv.) of octadecyl isocyanate1, and about 400.0 grams (0.910 equiv.) of an orange hydroxyl-containing colorant[2] was added to a 1000 ml three-neck resin kettle equipped with a Trubore stirrer, an $N_2$ atmospheric inlet, and thermocouple-temperature controller. The mixture was agitated for several minutes and about 0.5 grams of dibutyltindilaurate catalyst[3] was added and the reaction mixture heated to 135° C. with stirring under an $N_2$ atmosphere. After 4.0 hours at 135° C. an FT-IR spectrum of the product was obtained to insure all isocyanate functionality was consumed. The absence (disappearance) of a peak at about 2275 $cm^{-1}$ (NCO) and the appearance (or increase in magnitude) of peaks at about 1740–1680 $cm^{-1}$ and about 1540–1530 $cm^{-1}$ corresponding to urethane frequencies was used to confirm this. The final colored urethane wax product was then poured into aluminum molds and allowed to cool and harden. This final product was an orange wax at room temperature characterized by the following physical properties: viscosity of about 44.6 cPs as measured by a Ferranti-Shirley cone-plate viscometer at about 140° C., and melting point of 35° C. as measured by Differential Scanning Calorimetry using a DuPont 2100 calorimeter. The spectral strength of the wax was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the wax was measured as about 15665 milliliters×Absorbance Units per gram at the lambda max of about 493 nm.

[1]Mondur O—Octadecyl Isocyanate available from Bayer Corp. of Pittsburg, Pa.
[2]Experimental Orange 10108-31 available from Milliken and Company of Spartanburg, S.C.
[3]Dibutyltindilaurate available from Aldrich Chemicals of Milwaukee, Wis.

EXAMPLE 3

The Reaction Product of Octadecyl Isocyanate and Violet Reactive Colorant

About 144.3 grams (0.506 equiv.) of octadecyl isocyanate[1], and about 400.0 grams (0.522 equiv.) of a violet hydroxyl-containing colorant corresponding to Colorant U from Table I of U.S. Pat. No. 5,231,135 was added to a 1000 ml three-neck resin kettle equipped with a Trubore stirrer, an $N_2$ atmospheric inlet, and thermocouple-temperature controller. The mixture was agitated for several minutes and about 0.5 grams of dibutyltindilaurate catalyst[2] was added and the reaction mixture heated to 135° C. with stirring under an $N_2$ atmosphere. After 4.0 hours at 135° C. an FT-IR spectrum of the product was obtained to insure all isocyanate functionality was consumed. The absence (disappearance) of a peak at about 2275 $cm^{-1}$ (NCO) and the appearance (or increase in magnitude) of peaks at about 1740–1680 $cm^{-1}$ and about 1540–1530 $cm^{-1}$ corresponding to urethane frequencies was used to confirm this. The final colored urethane wax product was then poured into aluminum molds and allowed to cool and harden. This final product was a soft violet wax at room temperature characterized by the following physical properties: viscosity of about 23.8 cPs as measured by a Ferranti-Shirley cone-plate viscometer at about 140° C., and melting point of 12.3° C. as measured by Differential Scanning Calorimetry using a DuPont 2100 calorimeter. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The absorbance spectral strength of the wax was measured as about 19230 milliliters×Absorbance Units per gram at the lambda max of about 583 nm.

[1]Mondur O—Octadecyl Isocyanate available from Bayer Corp. of Pittsburg, Pa.
[2]Dibutyltindilaurate available from Aldrich Chemicals of Milwaukee, Wis.

EXAMPLE 4

The Reaction Product of Octadecyl Isocyanate and Cyan Reactive Colorant

About 169.3 grams (0.594 equiv.) of octadecyl isocyanate[1], and about 300.0 g (0.590 equiv.) of a cyan hydroxyl-containing colorant[2] was added to a 1000 ml three-neck resin kettle equipped with a Trubore stirrer, an $N_2$ atmospheric inlet, and thermocouple-temperature controller. The mixture was agitated for several minutes and about 0.5 grams of dibutyltindilaurate catalyst[3] was added and the reaction mixture heated to 135° C. with stirring under an $N_2$ atmosphere. After 4.0 hours at 135° C. an FT-IR spectrum of the product was obtained to insure all isocyanate functionality was consumed. The absence (disappearance) of a peak at about 2275 $cm^{-1}$ (NCO) and the appearance (or increase in magnitude) of peaks at about 1740–1680 $cm^{-1}$ and about 1540–1530 $cm^{-1}$ corresponding to urethane frequencies was used to confirm this. The final colored urethane wax product was then poured into aluminum molds and allowed to cool and harden. This final product was a cyan wax at room temperature characterized by the following physical properties: viscosity of about 46.3 cPs as measured by a Ferranti-Shirley cone-plate viscometer at about 140° C., and melting point of 32.2° C. as measured by Differential Scanning Calorimetry using a DuPont 2100 calorimeter. The spectral strength of the wax was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the wax was measured as about 26962 milliliters×Absorbance Units per gram at the lambda max of about 622 nm.

[1]Mondur O—Octadecyl Isocyanate available from Bayer Corp. of Pittsburg, Pa.
[2]Experimental Blue III 9495-28 available from Milliken and Company of Spartanburg, S.C.
[3]Dibutyltindilaurate available from Aldrich Chemicals of Milwaukee, Wis.

EXAMPLE 5

Clear Ink Base Used for Subsequent Examples

In a large stainless steel beaker about 1737 grams of the mixed urethane/urea resin product from Example 2 of co-pending U.S. Pat. application Ser. No. 08/672,609 filed Jun. 28, 1996, about 1737 grams of the resin from Example 5 of co-pending U.S. Pat. No. 5,750,604 issued May 12, 1998, about 3475 grams of stearyl stearamide (Witco S-180) and about 13.9 grams of Naugard 445 anti-oxidant were combined. The materials were melted together at a temperature of about 140° C. in an oven then blended by stirring in a temperature controlled mantle at about 115° C. for about ½ hour. The ink base was then filtered through a heated Mott apparatus (available from Mott Metallurgical) using #3 Whatman filter paper and a pressure of 15 psi. The filtered phase change ink base was poured into molds and allowed to solidify to form ink sticks. This material was used without further modification in the following examples (Examples 6–8).

The mixed urethane/urea resin product from Example 2 of the co-pending application described above was made as follows:

The Reaction Product of 1.5 Parts Hydroabietyl Alcohol, 0.5 Parts Octadecyl Amine, and 1.0 Part Isophorone Diisocyanate About 240.2 grams (0.676 moles) of hydroabietyl alcohol[1] was added to a 1000 ml four-neck resin kettle equipped with a Trubore stirrer, an $N_2$ atmosphere inlet, 200 ml addition funnel, and a thermocouple-temperature controller. About 100.0 grams (0.45 moles) of isophorone diisocyanate[2] was added to the addition funnel. Agitation of the hydroabietyl alcohol first was begun and then all of the isophorone diisocyanate was added over approximately 5 minutes. About 0.22 grams of dibutyltindilaurate[3] catalyst was added and the reaction mixture heated to about 125° C. under an $N_2$ atmosphere. After 4 hours at 125° C., about 59.95 grams (0.225 moles) of octadecyl amine[4] was added and the temperature raised to about 150° C. and held for approximately 2 hours. An FT-IR spectrum of the reaction product was obtained to insure all of the NCO functionality was consumed. The absence (disappearance) of a peak at about 2285 $cm^{-1}$ (NCO) and the appearance (or increase in magnitude) of peaks at about 1705–1635 $cm^{-1}$ and about 1515–1555 $cm^{-1}$ corresponding to urea frequencies and about 1740–1680 $cm^{-1}$ and about 1540–1530 $cm^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 314.8 cPs as measured by a Ferranti-Shirley cone-plate viscometer at about 140° C., a melting point of from about 67.9° C. to about 87.0° C. as measured by an electrothermal capillary melting point apparatus, and a $T_g$ of about 23° C. as measured by differential scanning calorimetry using a DuPont 2100 calorimeter at a scan rate of 20° C./minute.

[1] Abitol E—Hydroabietyl alcohol available from Hercules Inc. of Wilmington, Del.
[2] Desmodur I—Isophorone diisocyanate available from Bayer Corp. of Pittsburg, Pa.
[3] Dibutyltindilaurate available from Aldrich Chemicals of Milwaukee, Wis.
[4] Octadecyl amine (technical grade) available from ACROS Organics of New Jersey.

The diurethane resin product from Example 5 of the co-pending application described above was made as follows:

The Reaction Product of Octylphenol Ethoxylate and Isophorone Diisocyanate

About 450.4 grams (1.802 moles) of Triton X15 octylphenol ethoxylate[1] and about 200.0 grams (0.901 moles) of isophorone diisocyanate[2] was added to a 1000 ml three-neck resin kettle equipped with a Trubore stirrer, an $N_2$ atmosphere inlet, and a thermocouple-temperature controller. The mixture was agitated for 10 minutes and then about 0.33 grams of dibutyltindilaurate[3] catalyst was added and the reaction mixture heated to about 150° C. under an $N_2$ atmosphere. After 5.5 hours at about 150° C. an FT-IR spectrum of the product was obtained to insure all of the NCO functionality was consumed. The absence (disappearance) of a peak at about 2285 $cm^1$ (NCO) and the appearance (or increase in magnitude) of peaks at about 1740–1680 $cm^{-1}$ and about 1540–1530 $cm^{-1}$ corresponding to urethane frequencies were used to confirm this. The final di-urethane resin product was poured into aluminum molds and allowed to cool and harden. This final product was a clear solid resin at room temperature characterized by the following physical properties: viscosity of about 124.7 cPs as measured by a Ferranti-Shirley cone-plate viscometer at about 140° C., a melting point of from about 51.3° C. to about 81.9° C. as measured by an electrothermal capillary melting point apparatus, and a $T_g$ of about 36° C. as measured by differential scanning calorimetry using a DuPont 2100 calorimeter at a scan rate of 20° C./minute.

[1] Triton X15 octylphenol ethoxylate is available from Union Carbide Chemicals and Plastics Company Inc. of Danbury, Conn. Note: IGEPAL CA-210 octylphenol ethoxylate, available from Rhone-Poulenc Co., Cranbury, N.J., can be directly substituted for Triton X15 in this reaction.
[2] VESTANAT IPDI—Isophorone diisocyanate available from Huls America, Inc. of Piscataway, N.J.
[3] Dibutyltindilaurate available from Aldrich Chemicals of Milwaukee, Wis.

EXAMPLE 6

Cyan Ink Made From Urethane/Urea Resins and Cyan Urethane Wax

In a stainless steel beaker about 94.93 grams of the clear ink base from Example 5 of the instant application and about 5.25 grams of the cyan colored wax from Example 4 of the instant application were combined. The materials were melted together at a temperature of about 140° C. in an oven then blended by stirring in a temperature controlled mantle at about 115° C. for about ½ hour. The cyan ink was then filtered through a heated Mott apparatus (available from Mott Metallurgical) using #3 Whatman filter paper and a pressure of 15 psi. The filtered phase change ink was poured into molds and allowed to solidify to form ink sticks. The final ink product was characterized by the following physical properties: viscosity of about 13.3 cPs as measured by a Ferranti-Shirley cone-plate viscometer at about 140° C., a melting point of about 89° C. as measured by differential scanning calorimetry using a DuPont 2100 calorimeter and a $T_g$ of about 23° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the ink was measured as about 1427 milliliters×Absorbance Units per gram at the lambda max of about 622 nm.

EXAMPLE 7

Yellow Ink Made From Urethane/Urea Resins and Yellow Urethane Wax

In a stainless steel beaker about 93.64 grams of the clear ink base from Example 5 of the instant application and about 6.42 grams of the yellow colored wax from Example 1 of the instant application were combined. The materials were melted together at a temperature of about 140° C. in an oven then blended by stirring in a temperature controlled mantle at about 115° C. for about ½ hour. The yellow ink was then filtered through a heated Mott apparatus (available from Mott Metallurgical) using #3 Whatman filter paper and a pressure of 15 psi. The filtered phase change ink was poured into molds and allowed to solidify to form ink sticks. The final ink product was characterized by the following physical properties: viscosity of about 12.7 cPs as measured by a Ferranti-Shirley cone-plate viscometer at about 140° C., a melting point of about 89° C. as measured by differential scanning calorimetry using a DuPont 2100 calorimeter and a $T_g$ of about 22° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the ink was measured as about 1480 milliliters×Absorbance Units per gram at the lambda max of about 424 nm.

EXAMPLE 8

Black Ink Made From Urethane/Urea Resins and Mixed Colored Urethane Waxes

In a stainless steel beaker about 80.26 grams of the clear ink base from Example 5 of the instant application, about 5.24 grams of the cyan colored wax from Example 4 of the instant application, about 8.0 grams of the orange wax from Example 2 of the instant application and about 6.65 grams of the violet wax from Example 3 of the instant application were combined. The materials were melted together at a temperature of about 140° C. in an oven then blended by stirring in a temperature controlled mantle at about 115° C.

for about ½ hour. The black ink was then filtered through a heated Mott apparatus (available from Mott Metallurgical) using #3 Whatman filter paper and a pressure of 15 psi. The filtered phase change ink was poured into molds and allowed to solidify to form ink sticks. The final ink product was characterized by the following physical properties: viscosity of about 15.4 cPs as measured by a Ferranti-Shirley cone-plate viscometer at about 140° C., a melting point of about 89° C. as measured by differential scanning calorimetry using a DuPont 2100 calorimeter and a $T_g$ of about 17° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the ink was measured as about 1670 milliliters×Absorbance Units per gram at the lambda max of about 622 nm.

EXAMPLE 9

Cyan Ink Made From Fatty Amide Materials and Cyan Urethane Wax

In a stainless steel beaker about 380.2 grams of a clear ink base made from the formulation in Example 2 of U.S. Pat. No. 5,372,852 (about 41.5% by weight KEMAMIDE S-180 stearyl stearamide monoamide, about 21.5% by weight tetra-amide, about 27.5% by weight KE-311 rosin ester tackifier, and about 9.5% by weight SANTICIZER-278 phthalate ester plasticizer) and about 20.0 grams of the cyan colored wax from Example 4 of the instant application were combined. The materials were melted together at a temperature of about 140° C. in an oven then blended by stirring in a temperature controlled mantle at about 115° C. for about ½ hour. The cyan ink was then filtered through a heated Mott apparatus (available from Mott Metallurgical) using #3 Whatman filter paper and a pressure of 15 psi. The filtered phase change ink was poured into molds and allowed to solidify to form ink sticks. The final ink product was characterized by the following physical properties: viscosity of about 12.5 cPs as measured by a Ferranti-Shirley cone-plate viscometer at about 140° C., a melting point of about 94° C. as measured by differential scanning calorimetry using a DuPont 2100 calorimeter and a $T_g$ of about 2.2° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the ink was measured as about 1358 milliliters×Absorbance Units per gram at the lambda max of about 622 nm.

EXAMPLE 10

Yellow Ink Made From Fatty Amide and Yellow Urethane Wax

In a stainless steel beaker about 379.6 grams of a clear ink base made from the formula in Example 2 of U.S. Pat. No. 5,372,852 (about 41.5% by weight KEMAMIDE S-180 stearyl stearamide monoamide, about 21.5% by weight tetra-amide, about 27.5% by weight KE-311 rosin ester tackifier, and about 9.5% by weight SANTICIZER-278 phthalate ester plasticizer) and about 26.0 grams of the yellow colored wax from Example 1 of the instant application were combined. The materials were melted together at a temperature of about 140° C. in an oven then blended by stirring in a temperature controlled mantle at about 115° C. for about ½ hour. The yellow ink was then filtered through a heated Mott apparatus (available from Mott Metallurgical) using #3 Whatman filter paper and a pressure of 15 psi. The filtered phase change ink was poured into molds and allowed to solidify to form ink sticks. The final ink product was characterized by the following physical properties: viscosity of about 11.9 cPs as measured by a Ferranti-Shirley cone-plate viscometer at about 140° C., a melting point of about 94° C. as measured by differential scanning calorimetry using a DuPont 2100 calorimeter and a $T_g$ of about 1.7° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the ink was measured as about 1448 milliliters×Absorbance Units per gram at the lambda max of about 424 nm.

EXAMPLE 11

Black Ink Made From Fatty Amide and Mixed Colored Urethane Waxes

In a stainless steel beaker about 379.2 grams of a clear ink base made from the formula in Example 2 of U.S. Pat. No. 5,372,852 (about 41.5% by weight KEMAMIDE S-180 stearyl stearamide monoamide, about 21.5% by weight tetra-amide, about 27.5% by weight KE-311 rosin ester tackifier, and about 9.5% by weight SANTICIZER-278 phthalate ester plasticizer), about 13.66 grams of the cyan colored wax from Example 4 of the instant application, about 24.79 grams of the orange wax from Example 2 of the instant application, and about 17.36 grams of the violet wax from Example 3 of the instant application were combined. The materials were melted together at a temperature of about 140° C. in an oven then blended by stirring in a temperature controlled mantle at about 115° C. for about ½ hour. The black ink was then filtered through a heated Mott apparatus (available from Mott Metallurgical) using #3 Whatman filter paper and a pressure of 15 psi. The filtered phase change ink was poured into molds and allowed to solidify to form ink sticks. The final ink product was characterized by the following physical properties: viscosity of about 13.0 cPs as measured by a Ferranti-Shirley cone-plate viscometer at about 140° C., a melting point of about 95° C. as measured by differential scanning calorimetry using a DuPont 2100 calorimeter and a $T_g$ of about −1.4° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid wax in butanol and measuring the absorbance using a Perkin Elmer Lambda 2S UV/VIS spectrophotometer. The spectral strength of the ink was measured as about 1095 milliliters×Absorbance Units per gram at the lambda max of about 622 nm.

PRINT TESTING

The inks in examples 6–11 were tested in a Tektronix Phaser® 340 printer, which uses an offset transfer printing system. All of the above inks were found to completely transfer and to give images of good color, print quality and durability either as primary colors or when used in combination with each other or the commercial Phaser 340 printer Colorstix® inks.

The inks in Examples 6–10 were tested in a Tektronix Phaser® 300 printer, which uses a direct printing system. All of the above inks were found to give images of good color, print quality and durability either as primary colors or when used in combination with each other or the commercial Phaser 300 printer Colorstix® inks.

The phase change ink composition of the present invention can have a percentage composition of about 70% to about 97% by weight clear ink base and about 1% to about 25% by weight colored wax. A more preferred range is about 75% to about 95% by weight clear ink base and about 4% to about 24% by weight colored wax. A most preferred range is about 77% to about 96% by weight clear ink base and about 5% to about 13% by weight colored wax. The spectral strength of the ink composition of the present invention can range from about 100 to about 10,000 milliters×Absorbance Units per gram of the appropriate lambda max of the particular color being measured and more preferably from about 250 to about 5000 milliters×Absorbance Units per gram at the appropriate lambda max for the particular color being measured. Most preferably, the spectral strength ranges from about 500 to about 2500 milliters×Absorbance Units per gram at the appropriate lambda max for the particular color being measured. The colored urethane wax employed in the present invention can have a spectral strength for various colors ranging from about 5,000 to about 100,000 milliters×Absorbance Units per gram at the appropriate lambda max, more preferably from about 10,000 to about 50,000 milliters×Absorbance Units per gram at the appropriate lambda max and most preferably is from about 15,000 to about 30,000 milliters×Absorbance Units per gram at the appropriate lambda max.

While the invention has been described above with reference to specific embodiments thereof, it is apparent that many changes, modifications and variations can be made without departing from the inventive concept disclosed herein. For example, it should be noted where a urethane reaction product is obtained, a single alcohol precursor or multiple alcohol precursors may be used with an appropriate isocyanate as long as the required stoichiometric ratio is maintained. Similarly, where a urea is the reaction product, a single amine precursor or multiple amine precursors may be employed as long as the required stoichiometric ratio is maintained. Where a urethane/urea reaction product is obtained, single or multiple alcohol and amine precursors may be employed within the appropriate stoichiometric ratios. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink composition comprising in combination:
    (a) a colored urethane wax that is the reaction product of at least one hydroxyl-containing colorant and an isocyanate; and
    (b) a clear ink carrier composition.

2. The phase change ink composition of claim 1 wherein the spectral strength of the ink is from about 100 to about 10,000 milliters×Absorbance Units per gram.

3. The phase change ink composition of claim 1 wherein the isocyanate is selected from the group consisting of a monoisocyanate, a diisocyanate, a triisocyanate, a copolymer of a diisocyanate, and a copolymer of a triisocyanate.

4. The phase change ink composition of claim 1 wherein the isocyanate is octadecyl isocyanate.

5. The phase change ink composition of claim 1 wherein the clear ink carrier composition is a fatty amide-based material.

6. The phase change ink composition of claim 5 wherein the fatty amide material further includes a monoamide and a tetra-amide.

7. The phase change ink composition of claim 1 wherein the clear ink carrier composition comprises in combination:
    a. a mixed urethane/urea resin;
    b. a diurethane resin;
    c. a fatty amide; and
    d. an antioxidant.

8. The phase change ink composition of claim 7 wherein the mixed urethane/urea resin is the reaction product of
    (a) at least one alcohol;
    (b) an isocyanate; and
    (c) at least one amine.

9. The phase change ink composition of claim 8 further comprising the at least one alcohol in the mixed urethane/urea resin is selected from the group of alcohols consisting of a monohydric aliphatic alcohol, a monohydric aromatic alcohol, a monohydric aliphatic/aromatic alcohol, a monohydric fused ring alcohol, and a polyol and mixtures thereof.

10. The phase change ink composition of claim 9 further comprising the alcohol in the mixed urethane/urea resin is selected from the group consisting of hydroabietyl alcohol, octylphenol ethoxylate and octadecyl alcohol.

11. The phase change ink composition of claim 10 further comprising the alcohol in the mixed urethane/urea resin is octylphenol ethoxylate.

12. The phase change ink composition of claim 7 wherein the mixed diurethane resin is the reaction product of
    (a) at least one alcohol; and
    (b) an isocyanate.

13. The phase change ink composition of claim 12 further comprising the at least one alcohol in the diurethane resin is selected from the group of alcohols consisting of a monohydric aliphatic alcohol, a monohydric aromatic alcohol, a monohydric aliphatic/aromatic alcohol, a monohydric fused ring alcohol, and a polyol and mixtures thereof.

14. The phase change ink composition of claim 13 wherein the at least one alcohol in the diurethane resin is selected from the group consisting of hydroabietyl alcohol, octylphenol ethoxylate and octadecyl alcohol.

15. The phase change ink composition of claim 14 wherein the at least one alcohol in the diurethane resin is octylphenol ethoxylate.

16. The phase change ink carrier composition of claim 7 wherein the isocyanate in the diurethane resin is selected from the group consisting of a monoisocyanate, a diisocyanate, a triisocyanate, a copolymer of a diisocyanate, and a copolymer of a triisocyanate.

17. The phase change ink composition of claim 16 wherein the isocyanate in the diurethane resin is isophorone diisocyanate.

18. The phase change ink composition of claim 8 wherein the amine in the mixed urethane/urea resin is selected from the group of monoamines consisting of an aliphatic amine, an aromatic amine, an aliphatic/aromatic amine, a fused ring system amine, a multifunctional amine, a hydroxyl/amino containing compound and an amide.

19. The phase change ink composition of claim 18 wherein the amine in the mixed urethane/urea resin is octadecyl amine.

20. The phase change ink composition of claim 1 further comprising an anti-oxidant.

21. The phase change ink composition of claim 7 wherein the colored urethane wax is a blend of colored urethane waxes melted together and hardened to form a desired colored urethane wax.

22. The colored urethane wax of claim 1 wherein the spectral strength of the wax is from about 5,000 to about 100,000 milliters×Absorbance Units per gram.

23. A method for producing a layer of a phase change ink on a surface of a substrate, which comprises:

(1) forming a phase change ink composition in the solid phase, comprising an admixture of (a) a clear phase change carrier composition and (b) a colored urethane wax material; said colored urethane wax material being the reaction product of an isocyanate and a hydroxyl-containing colorant;

(2) transferring said solid phase, phase change ink composition to a phase change ink application means;

(3) raising the operating temperature of said application means to a level whereby a liquid phase, phase change ink composition is formed;

(4) providing a substrate in proximity to said application means;

(5) applying a predetermined pattern of said liquid phase, phase change ink composition to at least one surface of said substrate;

(6) lowering the temperature of said applied ink composition to form a solid phase, phase change ink pattern on the substrate.

24. A method for producing a layer of a phase change ink on the surface of a substrate, which comprises:

(1) employing in a printing apparatus a phase change ink composition in the solid phase comprising an admixture of (a) a clear phase change carrier composition and (b) a colored urethane wax material; said colored urethane wax material being the reaction product of an isocyanate and a hydroxyl-containing colorant;

(2) applying the phase change ink composition in a desired pattern to an intermediate transfer surface;

(3) transferring the desired pattern of the phase change ink composition to the surface of the substrate.

25. A colored urethane wax usable in a phase change ink formulation as a colorant, the colored urethane wax being the reaction product of at least one hydroxyl-containing colorant and an isocyanate, the colored urethane wax being free of any polyester polyol and being undiluted and uncut.

26. The colored urethane wax of claim 25 having a spectral strength of from about 5,000 to about 100,000 milliters×Absorbance Units per gram.

27. The colored urethane wax of claim 25 wherein the at least one hydroxyl containing colorant is about 98% pure.

28. A phase change ink composition comprising in combination:

(a) a colored urethane wax that is the reaction product of at least one hydroxyl-containing colorant and an isocyanate; and (b) a clear ink carrier composition comprising in combination a mixed urethane/urea resin, a diurethane resin, and a fatty amide.

29. The phase change ink composition of claim 28 wherein the isocyanate is selected from the group consisting of a monoisocyanate, a diisocyanate, a triisocyanate, a copolymer of a diisocyanate, and a copolymer of a triisocyanate.

30. The phase change ink composition of claim 28 wherein the isocyanate is octadecyl isocyanate.

31. The phase change ink composition of claim 28 wherein the mixed urethane/urea resin is the reaction product of (a) at least one alcohol;

(b) an isocyanate; and (c) at least one amine.

32. The phase change ink composition of claim 31 further comprising the at least one alcohol in the mixed urethane/urea resin is selected from the group of alcohols consisting of a monohydric aliphatic alcohol, a monohydric aromatic alcohol, a monohydric aliphatic/aromatic alcohol, a monohydric fused ring alcohol, and a polyol and mixtures thereof.

33. The phase change ink composition of claim 32 further comprising the alcohol in the mixed urethane/urea resin is selected from the group consisting of hydroabietyl alcohol, octylphenol ethoxylate and octadecyl alcohol.

34. The phase change ink composition of claim 33 further comprising the alcohol in the mixed urethane/urea resin is octylphenol ethoxylate.

35. The phase change ink composition of claim 28 wherein the mixed diurethane resin is the reaction product of (a) at least one alcohol, and (b) an isocyanate.

36. The phase change ink composition of claim 35 further comprising the at least one alcohol in the diurethane resin is selected from the group of alcohols consisting of a monohydric aliphatic alcohol, a monohydric aromatic alcohol, a monohydric aliphatic/aromatic alcohol, a monohydric fused ring alcohol, and a polyol and mixtures thereof.

37. The phase change ink composition of claim 36 wherein the at least one alcohol In the diurethane resin is selected from the group consisting of hydroabietyl alcohol, octylphenol ethoxylate and octadecyl alcohol.

38. The phase change ink composition of claim 37 wherein the at least one alcohol in the diurethane resin is octylphenol ethoxylate.

39. The phase change ink carrier composition of claim 28 wherein the isocyanate in the diurethane resin is selected from the group consisting of a monoisocyanate, a diisocyanate, a triisocyanate, a copolymer of a diisocyanate, and a copolymer of a triisocyanate.

40. The phase change ink composition of claim 39 wherein the isocyanate in the diurethane resin is isophorone diisocyanate.

41. The phase change ink composition of claim 29 wherein the amine in the mixed urethane/urea resin is selected from the group of monoamines consisting of an aliphatic amine, an aromatic amine, an aliphatic/aromatic amine, a fused ring system amine, a multifunctional amine, a hydroxyl/amino containing compound and an amide.

42. The phase change ink composition of claim 41 wherein the amine in the mixed urethane/urea resin is octadecyl amine.

43. The phase change ink composition of claim 28 wherein the spectral strength of the ink is from about 100 to about 10,000 milliters×Absorbance Units per gram.

44. The phase change ink composition of claim 28 further including an antioxidant.

* * * * *